United States Patent
Mola et al.

(10) Patent No.: US 8,234,878 B2
(45) Date of Patent: Aug. 7, 2012

(54) SYSTEM AND METHOD FOR CONTROLLING THE AIR-CONDITIONING SYSTEM OF A VEHICLE WITH REDUCED ENERGY CONSUMPTION

(75) Inventors: Stefano Mola, Orbassano (IT); Carloandrea Malvicino, Orbassano (IT)

(73) Assignee: C.R.F. Societa Consortile per Azioni (IT)

( * ) Notice: Subject to any disclaimer, the term of this patent is extended or adjusted under 35 U.S.C. 154(b) by 725 days.

(21) Appl. No.: 12/293,254

(22) PCT Filed: Mar. 16, 2007

(86) PCT No.: PCT/IB2007/000660
§ 371 (c)(1), (2), (4) Date: Feb. 19, 2009

(87) PCT Pub. No.: WO2007/107837
PCT Pub. Date: Sep. 27, 2007

(65) Prior Publication Data
US 2009/0217685 A1    Sep. 3, 2009

(30) Foreign Application Priority Data
Mar. 17, 2006 (IT) .............................. TO2006A0203

(51) Int. Cl.
*F25B 1/00*       (2006.01)
*F25B 49/02*      (2006.01)

(52) U.S. Cl. .............. 62/226; 62/228.1; 62/229; 62/244
(58) Field of Classification Search .................. 62/226, 62/228.1, 229, 244
See application file for complete search history.

(56) References Cited

U.S. PATENT DOCUMENTS

| | | | |
|---|---|---|---|
| 5,826,439 A | 10/1998 | Baruschke et al. | |
| 2001/0027659 A1* | 10/2001 | Ota et al. | ..... 62/228.3 |
| 2003/0051494 A1 | 3/2003 | Ohya | |
| 2004/0146085 A1 | 7/2004 | Lindner et al. | |

FOREIGN PATENT DOCUMENTS

| | | |
|---|---|---|
| EP | 1787838 | 5/2007 |
| WO | WO03099597 | 12/2003 |

* cited by examiner

*Primary Examiner* — Marc Norman
(74) *Attorney, Agent, or Firm* — The Belles Group, P.C.

(57) ABSTRACT

An air-conditioning system (1) for an environment, in particular for the passenger compartment of a vehicle, is provided with an evaporator (13) and a compressor (18) coupled to the evaporator (13). In a system (30) for controlling the air-conditioning system (1), a control electronics (33) switches an operating condition of the compressor (18) when the temperature of the air leaving the evaporator (13) has a pre-set relation with a threshold temperature ($T_{thresh}$). The control electronics varies the value of the threshold temperature ($T_{thresh}$) as a function, in at least certain operating conditions, of a set-point temperature ($T_{sp}$), required by a user of the air-conditioning system (1), so as to reduce the energy consumption associated to the air-conditioning system.

20 Claims, 6 Drawing Sheets

SYSTEM AND METHOD FOR CONTROLLING THE AIR-CONDITIONING SYSTEM OF A VEHICLE WITH REDUCED ENERGY CONSUMPTION

CROSS-REFERENCE TO RELATED PATENT APPLICATIONS

The present application is a U.S. national stage application under 35 U.S.C. §371 of PCT Application No. PCT/IB2007/000660, filed Mar. 16, 2007, which in turn claims the priority benefit of Italian Patent Application No. TO2006A000203, filed Mar. 17, 2006, the entireties of which are incorporated herein by reference.

TECHNICAL FIELD

The present invention relates to a system and a method for controlling the air-conditioning system of a closed environment, in particular the passenger compartment of a vehicle, with reduced energy consumption.

BACKGROUND ART

As is known and as is illustrated schematically in FIG. 1, an air-conditioning system 1, in particular of a vehicle 1a (illustrated schematically), comprises: an air-conditioning assembly 2; a cooling circuit 3 of the closed-loop type and a heating circuit 4, both connected to the air-conditioning assembly 2.

The cooling circuit 3 is provided with a duct 11 for supply of air to be treated, which has a first inlet 11a, communicating with the outside of the vehicle 1a, and a second inlet 11b, communicating with the passenger compartment (not illustrated) of the vehicle. The air-supply duct 11 has an outlet 11c, communicating with an inlet 2a of the air-conditioning assembly 2. A first selector 12 is set along the air-supply duct 11 for directing the flow at its inlets 11a, 11b towards the outlet 11c. In this ways the air to be treated can be taken in selectively from the environment external to the vehicle and/or from the passenger compartment of the vehicle (the so-called air-recirculation function) according to the position assumed by the first selector 12.

The air-conditioning assembly 2 comprises an evaporator 13 set at its inlet 2a and adapted to be traversed by the air coming from the air-supply duct 11.

The evaporator 13 is also traversed by a coolant, in particular a gas, for example R134a, which flows along a duct 14 connecting the elements that form the cooling circuit 3. During traversal of the evaporator 13, the air transfers heat to the coolant and cools off.

The coolant leaving the evaporator 13 is supplied, through the duct 14, to the inlet of a compressor 18, which is in turn connected at outlet to a condenser 19. Furthermore, a capillary 20 (or alternatively a thermostatic expansion valve) is set between the outlet of the condenser 19 and the inlet of the evaporator 13. The compressor 18 takes in, at a certain intake pressure, the coolant in the vapour phase from the evaporator 13 so as to obtain a control of the temperature of the air downstream of the evaporator 13, the condenser 19 receives the coolant in the vapour phase from the compressor 19, and the capillary 20 receives the coolant in the liquid phase from the condenser 19 to supply it in two phases (the vapour phase and the liquid phase) to the evaporator 13.

The air-conditioning assembly 2 further comprises a mixer 15 communicating through a duct 15c with an outlet of the evaporator 13. Set within the duct 15c is a fan 17, configured to create a forced flow of air from the evaporator 13 to the mixer 15.

The mixer 15 defines an internal chamber 24, defined within which are a first path 24c and a second path 24h separated from one another and selectable at inlet by means of a second selector 23, which supplies the air coming from the duct 15c to the paths 24h and 24c. In particular, the second selector 23 can be set in a first limit position (indicated by the dashed line), in which all the inlet air is supplied to the first path 24c, in a second limit position (not illustrated), in which all the inlet air is supplied to the second path 24h, and in a plurality of intermediate positions (one of which is indicated by a solid line), in which the inlet air is partialized between the two paths.

In particular, the second path 24h communicates with an outlet of the heating circuit 4, which is conveniently constituted by a heat exchanger of the liquid/air type, adapted to receive a flow of cooling liquid of the internal-combustion engine (not illustrated) of the vehicle 1a, in some cases through a control solenoid valve.

The chamber 24 also communicates at outlet with the passenger compartment through a diffuser 26, to which aeration mouths are connected.

In the mixer 15, the cold air coming from the evaporator 13, before being introduced into the passenger compartment of the vehicle by the diffuser 26 through the mouths, can be mixed with hot air coming from the heating circuit 4. In particular, the flow of cold air F1 at outlet from the fan 17 can be appropriately mixed with the flow of hot air F2 coming from the heating circuit 4 by means of the second selector 23. The second selector 23 can be positioned both so as to channel the entire flow of cold air F1 towards the diffuser 26 (so-called "all cold" position), without enabling any passage of cold air within the hot-air duct and thus preventing mixing of the hot and cold air, and so as to enable completely ("all hot" position) or just in part passage of the flow of cold air F1 within the hot-air duct, thus favouring mixing of the two flows of cold air F1 and hot air F2. The mixing can be controlled as a function, among other things, of a temperature that has been set (the so-called "set-point temperature"), designated in what follows by $T_{sp}$, required by the occupants of the vehicle and set via appropriate means for regulating the temperature inside the passenger compartment.

In particular, if we designate by $T_{in}$ the temperature of the air at the inlet of the evaporator 13 (which can consequently be air coming from outside, or a mixture of air coming from outside and from the air-recirculation system), $T_w$ the temperature of the cooling liquid at the inlet of the heating circuit 4, $T_c$ the temperature of the air leaving the evaporator 13, $T_t$ the temperature at the inlet of the diffuser 26, $\gamma$ the fraction of flow of air in the hot-air duct, and $\epsilon$ the efficiency of the heating circuit 4, the following relation applies:

$$T_t T_c = f(\gamma, \epsilon, T_w, T_c)$$

As illustrated in FIG. 1, control of the air-conditioning system 1, and in particular control of the fan 17, of the compressor 16, and of the mixer 15, is obtained by means of an electronic control unit 28, receiving signals from various sensors present both inside and on the outside of the vehicle 1a (for example, internal-temperature and external-temperature sensors, humidity sensors, etc.).

In particular, in NP (Normal Production) systems, a fixed-displacement compressor is managed by the electronic control unit 28 also on the basis of the output of a temperature sensor, set downstream of the evaporator 13 and hence detecting the temperature $T_c$ of the air leaving the evaporator. When the temperature $T_c$ of the air leaving the evaporator 13 drops below a pre-set threshold (defined hereinafter as "disconnection threshold") the compressor 18 is deactivated to prevent the water condensed on the surface of the evaporator from freezing and causing obstruction of part of the corresponding heat-exchange surface. The compressor 18 hence works in "on-off" mode with respect to the disconnection threshold, said threshold being set and fixed, for example, at a value of 3° C. Possibly, a hysteresis can be envisaged for reconnection of the compressor 18, which is actuated again when the temperature $T_c$ exceeds a "connection threshold", which has a value that is higher than the disconnection threshold and that is also pre-set and fixed, for example, at 5° C.

In a system of the type described above, a cooling capacity is normally produced that is excessive with respect to the one that would be necessary to guarantee thermal comfort conditions in the vehicle passenger compartment. This occurs certainly using fixed-displacement compressors, but also using a variable-displacement compressor of an internal-control type, both in conditions of low thermal load and in conditions of high thermal load, once the "cool-down" transient ends. In particular, a desired temperature is reached in the passenger compartment by mixing the flow of air at outlet from the evaporator 13 (which is in any case treated completely by the evaporator) with the flow of hot air at outlet from the heating circuit 4 (so-called "post-heating"). This enables raising of the temperature of the air introduced into the passenger compartment with respect to the temperature of the cooled air but clearly entails destruction of part of the generated cooling capacity, which, since the compressor is driven by the engine, in turn entails an increase in the energy used and in the consumption of the vehicle.

DISCLOSURE OF INVENTION

The aim of the present invention is to provide a system for controlling the air-conditioning system of a vehicle that will enable an improvement to systems of a known type and elimination of the disadvantages connected thereto, as well as enabling, in particular, a reduction in the related energy consumption.

According to the present invention, a system and a method for controlling an air-conditioning system are consequently provided, substantially as defined in claims 1 and 21, respectively.

BRIEF DESCRIPTION OF THE DRAWINGS

For a better understanding of the present invention, preferred embodiments thereof are now described, purely by way of non-limiting example and with reference to the attached plate of drawings, wherein.

BEST MODE FOR CARRYING OUT THE INVENTION

As will be clarified in what follows, an aspect of the present invention envisages controlling a variation of a threshold temperature $T_{thresh}$ for connection/disconnection of a compressor in an air-conditioning system, and in particular determining the threshold temperature, at least in certain operating conditions according to a set-point temperature $T_{sp}$, required by a user and set via appropriate regulating means; the set-point temperature $T_{sp}$ being also indicative of a target temperature that is to be generated in the passenger compartment of the vehicle. In particular, there is at least one operating condition in which the threshold temperature $T_{thresh}$ for connection/disconnection of the compressor increases, for example with a linear relation, as the set-point temperature $T_{sp}$ set in the passenger compartment increases.

There now follows a description of a first embodiment of a control system according to the invention, for a manual air-conditioning system provided with a fixed-displacement compressor (similar considerations apply in the case where a variable-displacement compressor with clutch is provided). The manual air-conditioning system is provided with temperature setting means for setting the set-point temperature $T_{sp}$, located in the passenger compartment and actuatable by the user, for example in the form of a knob coupled to a so-called "non-electrified" assembly.

Figure 1:
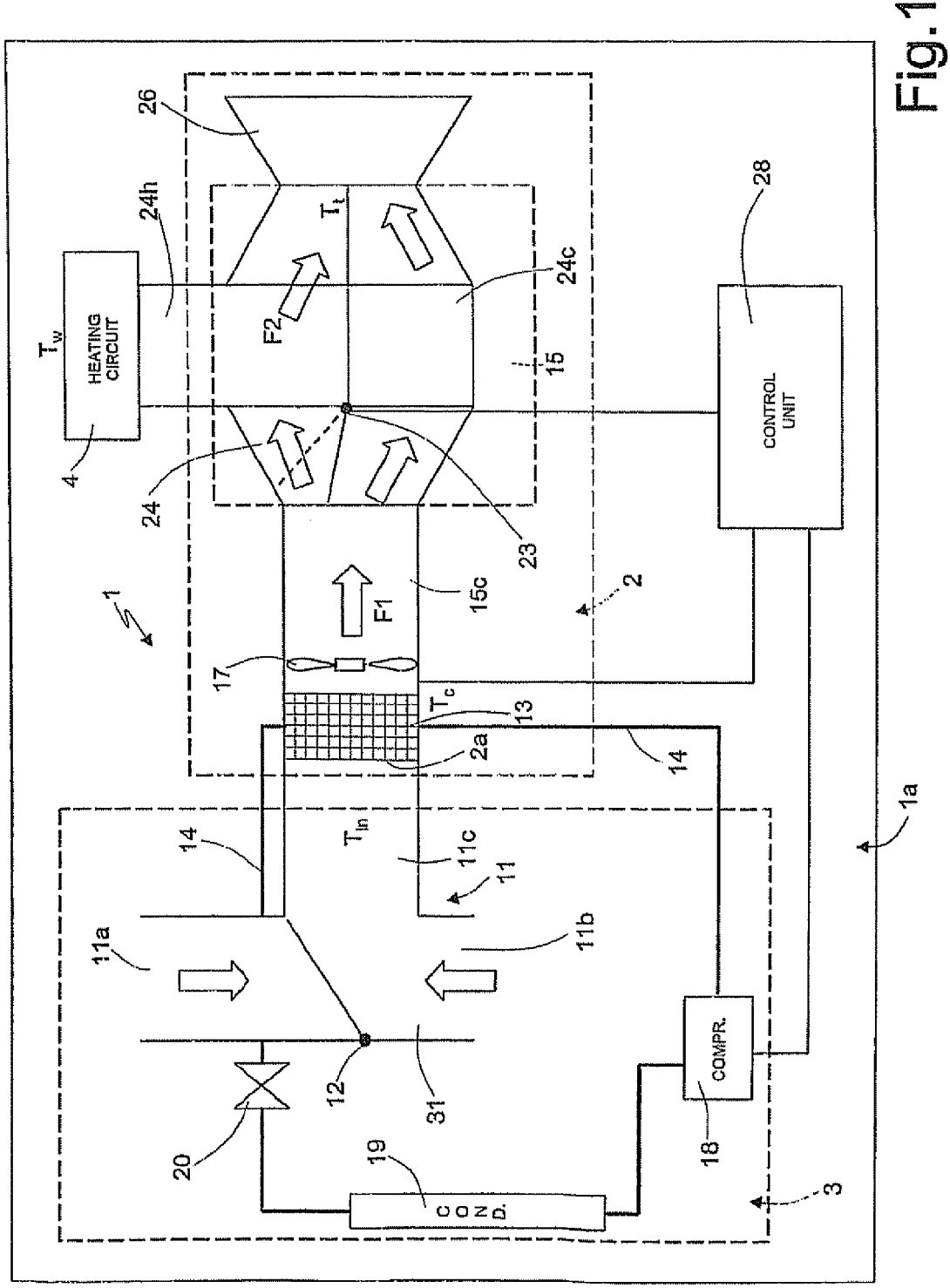
FIG. 1 shows a simplified diagram of an air-conditioning system.
Figure 2:
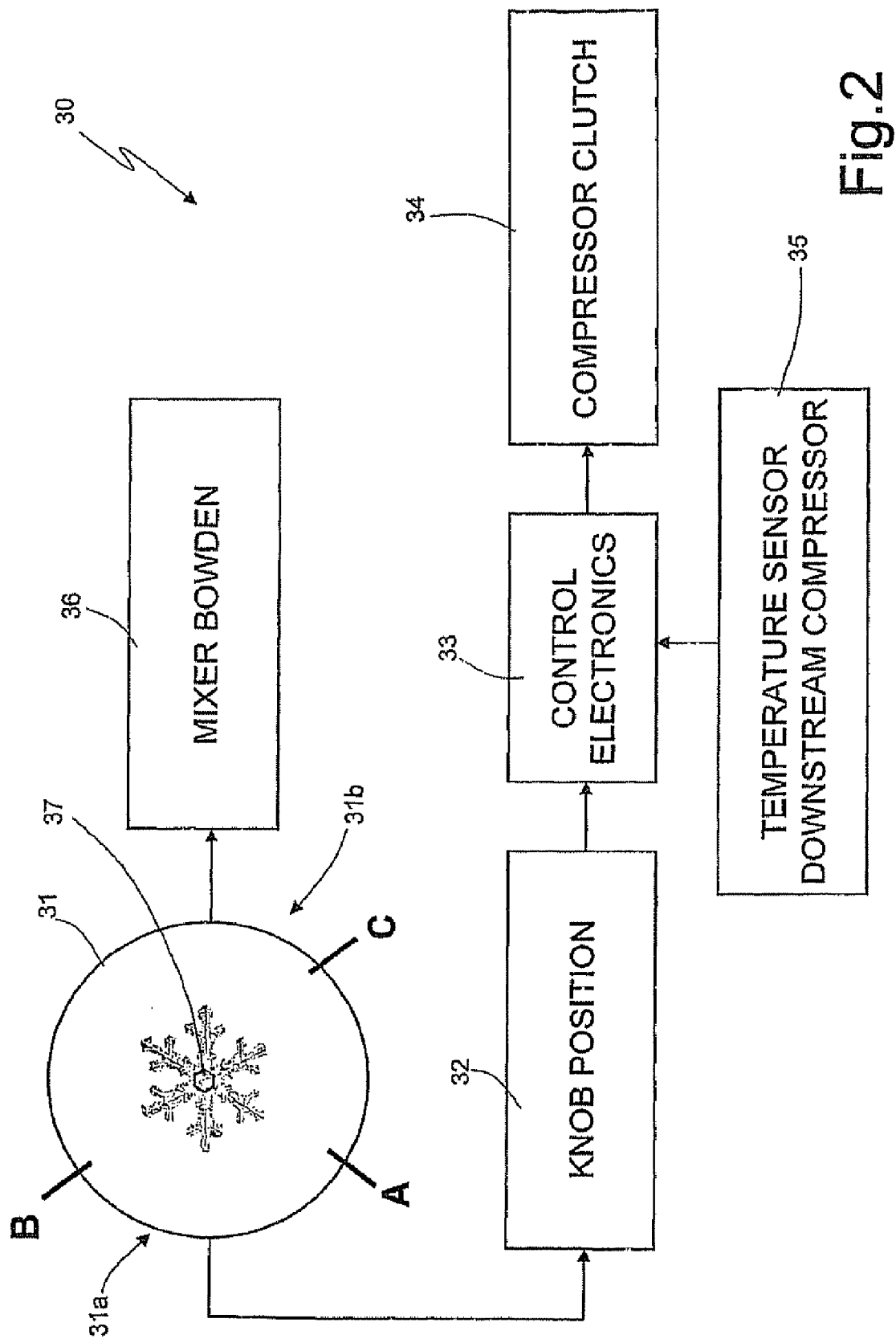
FIG. 2 shows a block diagram of a control system of a low-consumption manual air-conditioning system according to a first embodiment of the present invention.

With reference to FIG. 2 (and once again to the general system diagram described in FIG. 1), the control system 30 comprises the aforesaid temperature setting means, including a knob 31 having a range of rotation divided into a cold sector 31a (between point A and point B in FIG. 2) and a hot sector 31b (between point B and point C in FIG. 2). In particular, two different control logics of the air-conditioning system correspond to the first and second sector.

The control system 30 further comprises: position-detection means 32, adapted to detect the position of rotation of the knob 31 (to which corresponds a set-point temperature $T_{sp}$ set by the user); a control electronics 33 (for example, forming part of the electronic control unit 28 of the air-conditioning system 1), which acts on the compressor 18, for example on a clutch 34 thereof, and determines its activation or deactivation (for example, using a PWM control); a temperature sensor 35, set downstream of the compressor 18 and connected to the control electronics 33; and a bowden cable 36 mechanically coupled to the knob 31 and designed to control opening of the second selector 23 of the mixer 15.

If the knob 31 is located within the cold sector 31a, to each point thereof there corresponds (in a pre-set manner) a different threshold temperature $T_{thresh}$ for connection/disconnection of the compressor 18. In particular (FIG. 3), the threshold temperature $T_{thresh}$ progressively increases linearly with the approach of the knob 31 to the hot sector 31b. In a similar way, given that a value of the set-point temperature $T_{sp}$ set by the user is associated to the position of the knob 31, the threshold temperature $T_{thresh}$ increases within the cold sector 31a as the set-point temperature $T_{sp}$ increases.

According to the value of the threshold temperature $T_{thresh}$, the compressor 18 is turned off (OFF state) if the following relation applies:

$$T_c < T_{thresh} - dT$$

where $T_c$ is the temperature downstream of the evaporator 13, and dT is a pre-set temperature difference. The compressor is instead turned on (ON state) if the following relation applies:

$$T_c > T_{thresh} + dT$$

In any case, with the knob 31 in the cold sector 31*a*, a LED indicating the ON/OFF state of the compressor is turned on or turned off according to the state of the compressor 18, and the second selector 23 of the mixer 15 is in the "all cold" position. In fact, the desired temperature in the passenger compartment is reached by appropriately varying the connection/disconnection threshold of the compressor 18, without any mixing with the hot air coming from the heating circuit 4.

Figure 3:
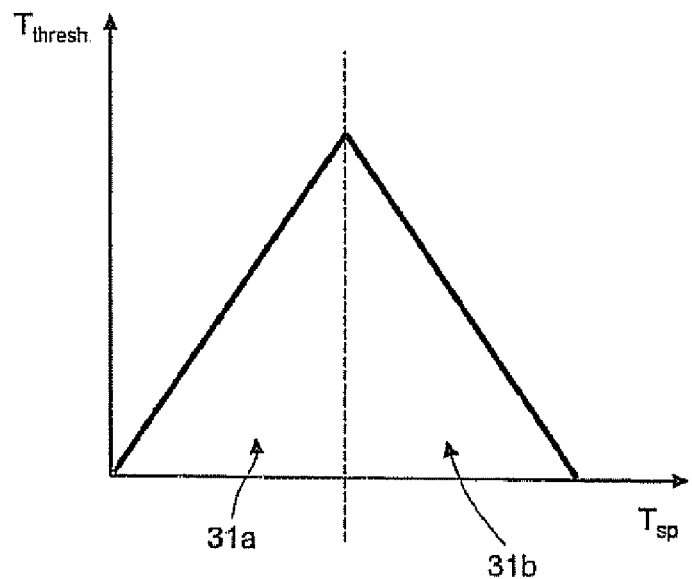
FIG. 3 shows a graph of a threshold temperature in the control system of FIG. 2.

If, instead, the position of the knob 31 is located within the hot sector 31*b*, the second selector 23 starts enabling mixing with the hot air coming from the heating circuit 4, the compressor is deactivated (LED turned off), and the knob 31 controls directly mechanically) the bowden cable that set the position of the selector. In particular, the position B corresponds to the "all cold" position, whereas the position C corresponds to the "all hot" position of the second selector 23. In any case, the user has the possibility of forcing activation of the compressor 18 (for example, by depressing a push-button 37 provided for the purpose and located in a central position with respect to the knob 31), for example, to enable dehumidification of the passenger compartment. For this purpose, the threshold temperature $T_{thresh}$ is continuously determined, even when the compressor 18 is off, once again according to the position of the knob 31 (or equivalently of the set-point temperature $T_{sp}$ set by the user) As illustrated in FIG. 3, the pattern of the threshold temperature $T_{thresh}$ within the hot sector 31*b* is specular to the one in the cold sector 31*a*: in particular, the threshold temperature $T_{thresh}$ decreases in a linear manner as the knob approaches the "all hot" position C, and hence a maximum threshold temperature corresponds to the "all cold" position B, whereas a minimum threshold temperature corresponds to the "all hot" position C.

Turning of the knob 31 beyond the position B in a clockwise direction determines turning-off of the compressor 18, whereas turning of the knob 31 beyond the same position B in a counterclockwise direction determines turning-on of the compressor 18.

Figure 4:
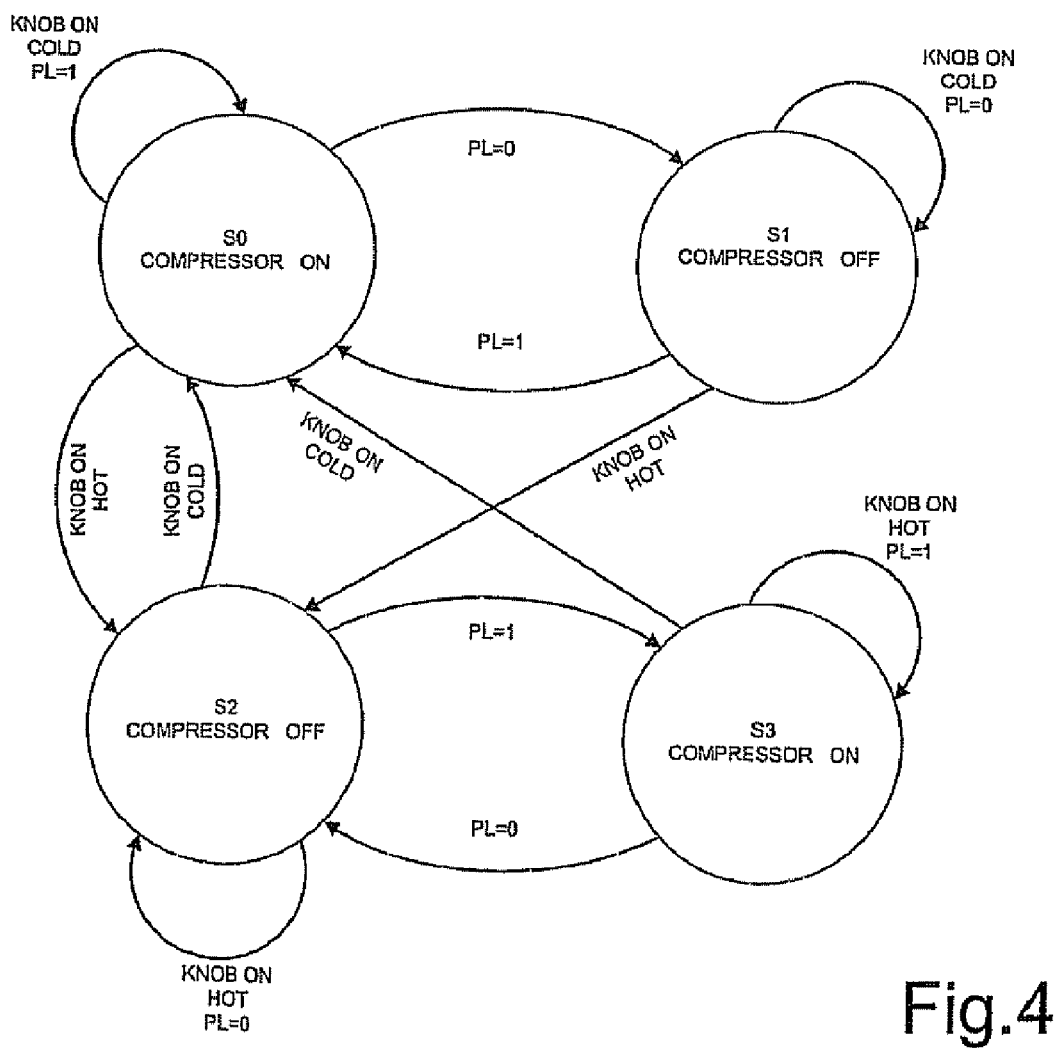
FIG. 4 shows a state diagram corresponding to operations executed in the control system of FIG. 2.

FIG. 4 sums up, by means of a state diagram, the operation of the control system 30, described previously.

In detail, corresponding to an initial state S0 is a condition in which the compressor 18 is turned on and the knob 31 is located in the cold sector 31*a*. The system remains in this state as long as the knob is not displaced from the cold sector, and the push-button 37 remains depressed, PL=1 (the ON state of the compressor 19 corresponding to the push-button being depressed).

If the push-button 37 is released (PL=0), there is a transition to a state S1, in which the compressor 18 is turned off. The system remains in this state as long as the push-button remains released and the knob 31 remains in the cold sector 31*a*. If the push-button is depressed, there is a transition from the state S1 back to the state S0.

From the state S1 the transition to a state S2 is also possible, in the case where the knob 31 is displaced within the hot sector 31*b*; the compressor 18 remains in any case turned off.

Also possible is the transition from the initial state S0 to the state S2, once again in the case where the knob enters the hot sector 31*b*.

The system remains in the state S2 as long as the push-button 37 is not depressed again and the knob remains in the hot sector 31*b*. If the knob is displaced into the cold sector, a transition occurs into the state S0 whereas, if the push-button is depressed, a transition occurs into a state S3, in which the compressor is in the ON state.

The system remains in the state S3 as long as the push-button 37 remains depressed and the knob is in the hot sector 31*b*. If the knob is displaced into the cold sector 31*a*, a transition occurs into the state S0 whereas, if the push-button is released, a transition occurs into the state S2.

Figure 5:
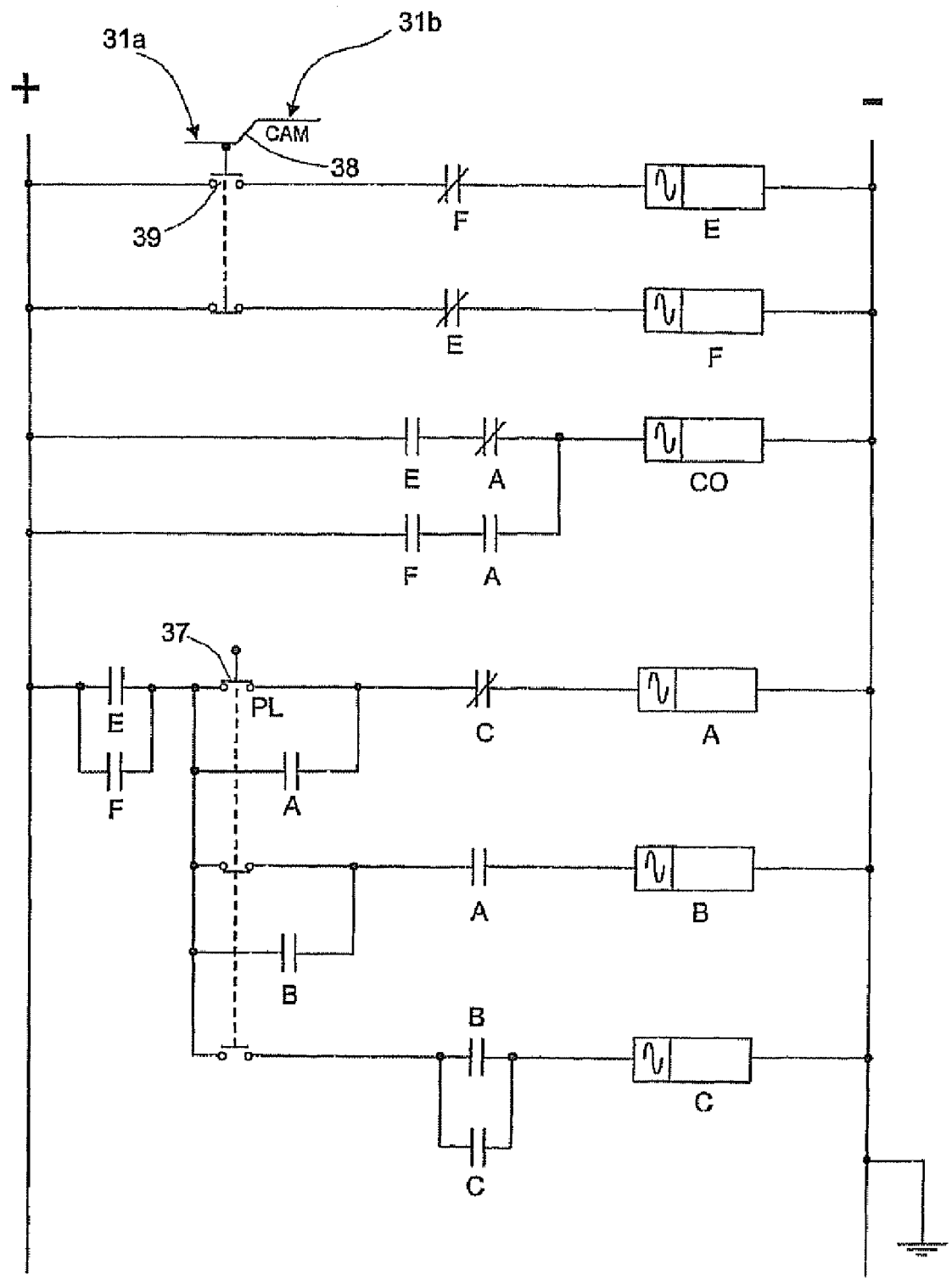
FIG. 5 shows a detailed electrical diagram of a possible implementation of a part of the control system.

FIG. 5 illustrates for reasons of completeness an electrical diagram illustrating the connections between the knob 31, the push-button 37, and a relay CO for activating the compressor 18. In particular, the knob 31 acts via a cam 38 on an internal push-button 39, the passage from the cold sector 31*a* to the hot sector 31*b* determining a switching of the open/closed state of the internal push-button 39. In a way not described in detail but that will be evident to a person of ordinary skill in the art, this connection envisages the use of a plurality of internal relays A, B, C, E, F and of normally open or normally closed contacts, controlled by the internal relays. Each of the relays is activated when an electrical connection (and a corresponding passage of current) is made between a supply line (designated by +) and a ground line (designated by −). This circuit arrangement causes the compressor 18 to be usually on when the knob 31 is located in the cold sector 31*a* and usually off when the knob is located in the hot sector 31*b*. When the push-button 37 is depressed by the user it is in any case possible to force switching of the compressor 18 into an ON state or an OFF state irrespective of the position of the knob.

Figure 6:
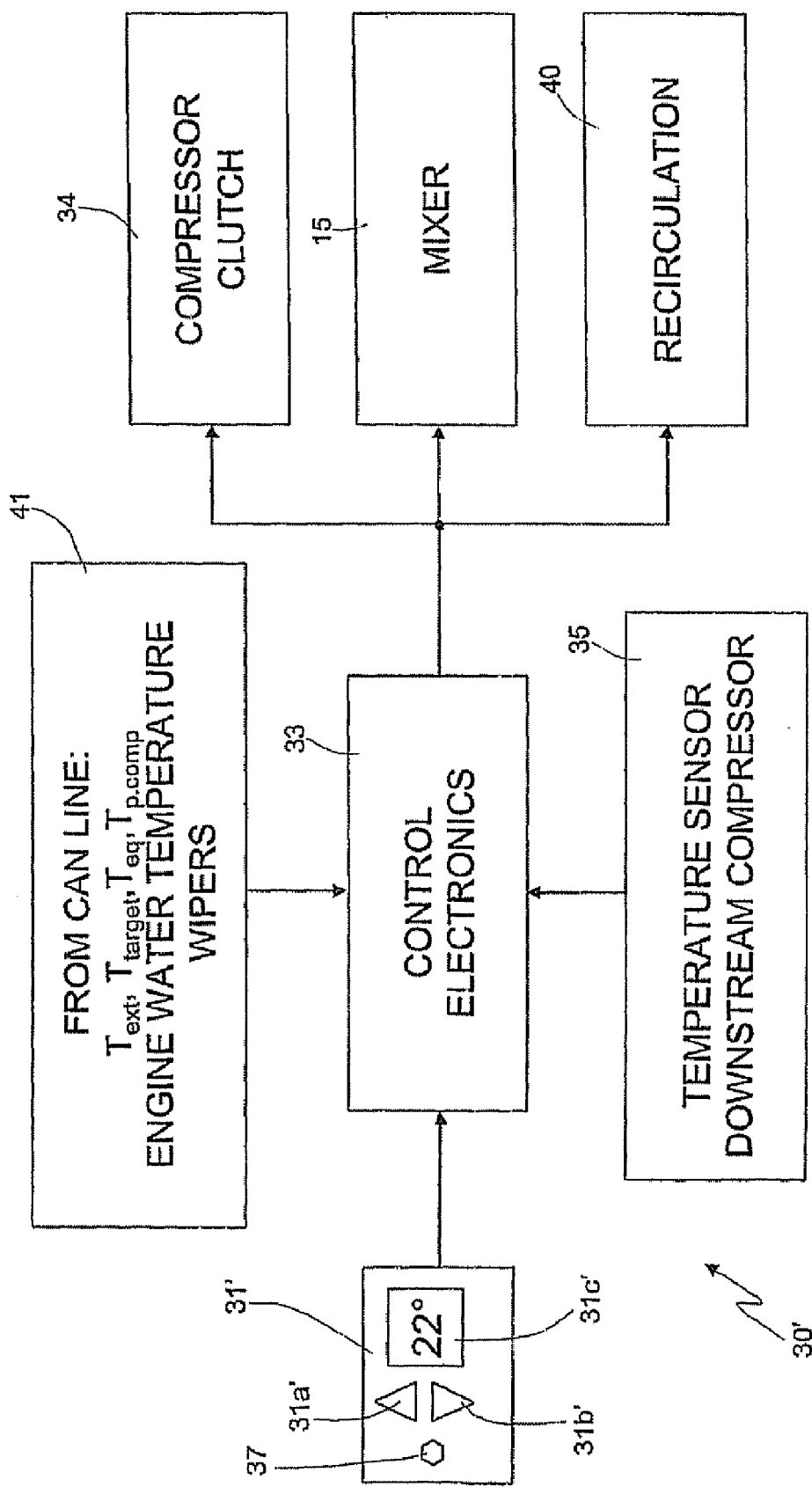
FIG. 6 shows a block diagram of a control system of a low-consumption automatic air-conditioning system, in accordance with a second embodiment of the present invention.

With reference to FIG. 6 (and once again to the general system diagram of FIG. 1), there now follows a description of a second embodiment of the control system according to the invention, for an automatic air-conditioning system, once again equipped with a fixed-displacement compressor (or else one of a variable-displacement internal-control type, provided with a clutch), and with temperature setting means for setting the set-point temperature $T_{sp}$ provided in the passenger compartment and actuatable by the user, for example in the form of a digital button, designated by 31'. The digital button 31' comprises, for example, a first portion 31*a* for increasing the set-point temperature $T_{sp}$, for example, by fixed amounts, and a second portion 31*b'* for decreasing the set temperature in a similar way. Furthermore, display means 31*c'* can be provided to display the set temperature to the user. Once again, the push-button 37 is provided to force activation of the compressor 18.

In detail, the control system 30' in this case comprises, in addition to the aforesaid temperature setting means: the control electronics 33, acting this time not only on the clutch 34 of the compressor, determining activation thereof, but also directly on the mixer 15 and on an air-recirculation system 40 of the air-conditioning system 1; a temperature sensor 35, set downstream of the compressor 18 and connected to the control electronics 33; and a plurality of sensors 41, which are also connected to the control electronics 33 via a CAN line present on board the vehicle, and comprising among others a sensor for detecting the external temperature $T_{ext}$, a sensor for detecting water temperature in the engine, a sensor for activating the windscreen wipers of the vehicle, a sensor for detecting the temperature of the passenger compartment $T_{p.comp}$, set in an appropriate position within the passenger compartment of the vehicle for detecting a temperature perceived by the user, and a sensor for the equivalent temperature $T_{eq}$, which is also set within the passenger compartment, in the proximity of the air vents at the outlet of the diffuser 26, for detecting temperature at the vents. Furthermore, the control electronics 33 receives, through the CAN line, further temperature information, appropriately calculated by the electronic control unit 28 of the vehicle 1a, and in particular a target temperature $T_{target}$, representing an estimated temperature of the air to be sent to the vents for meeting the user requirements, and receives, from the temperature setting means, the set-point temperature $T_{sp}$ set by the user.

Figure 7:
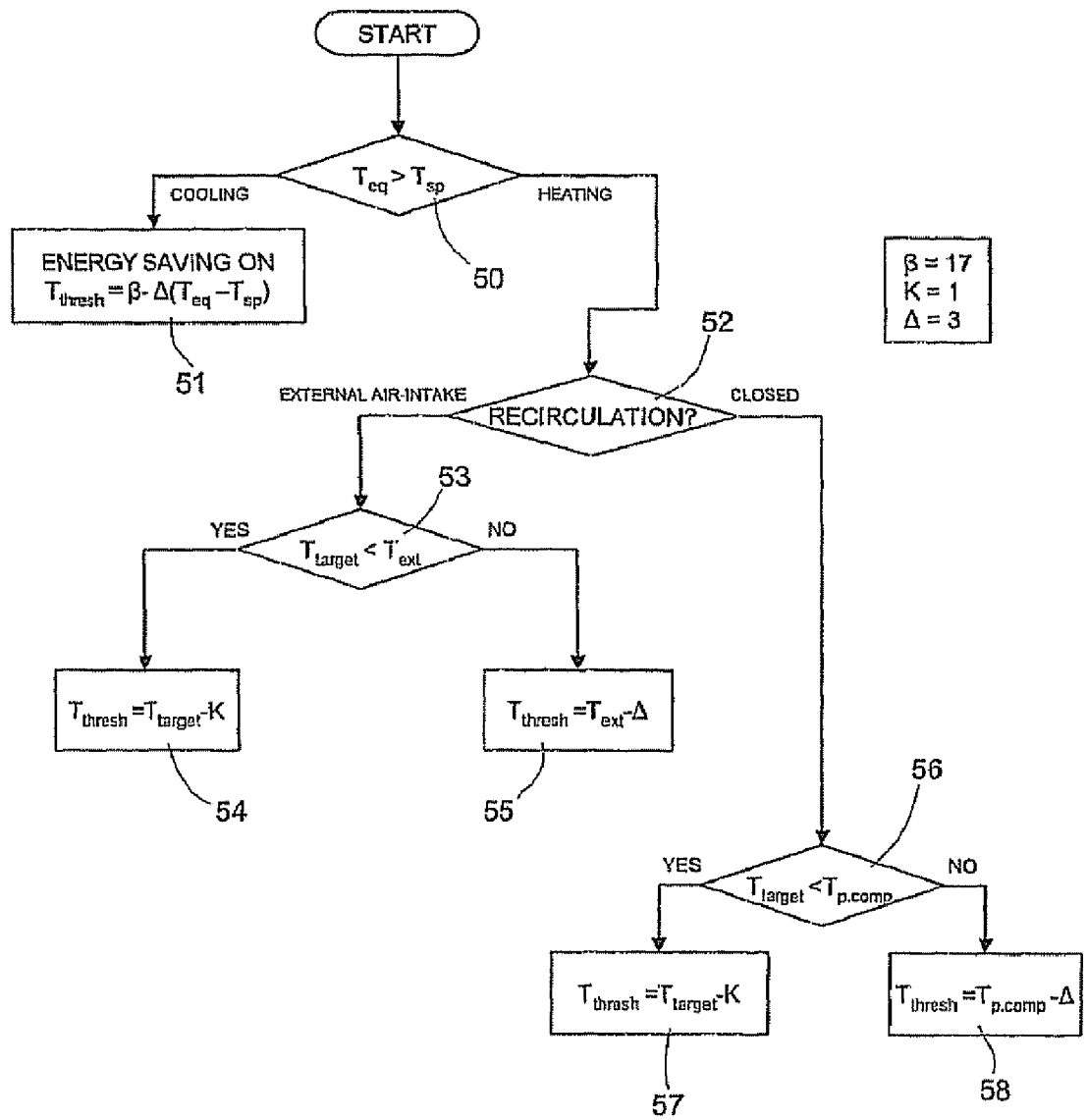
FIG. 7 shows a flowchart corresponding to operations executed by the control system of FIG. 6.

Described in what follows with reference to FIG. 7 is an algorithm implemented by the control electronics 33 for calculating a threshold temperature $T_{thresh}$ for controlling the clutch of the compressor 18 and connection/disconnection of the compressor according to external conditions, the situation in the passenger compartment, and the set point. In particular, it is emphasized that the threshold temperature $T_{thresh}$ is constantly determined by the control electronics 33, irrespective of the operative state, ON or OFF, of the compressor 18. In fact, even with the compressor turned off, the threshold temperature is calculated to take into account the possibility of the user deciding to activate the compressor, for example for dehumidification of the passenger compartment.

In detail, in an initial block 50 it is determined whether, on the basis of the requirements of the user and of the general conditions in the passenger compartment, it is necessary to cool off or heat up the passenger compartment of the vehicle. In particular, when the equivalent temperature $T_{eq}$ is higher than the set-point temperature $T_{sp}$, it is determined that it is necessary to cool off the passenger compartment, and there is a passage to a block 51 and to a summer management procedure, whereas when the equivalent temperature $T_{eq}$ is lower than or equal to the set-point temperature $T_{sp}$, it is determined that it is necessary to heat up the passenger compartment, and there is a passage to a block 52, and to a winter management procedure.

In greater detail, in block 51 a temperature error is calculated between a temperature measured in the passenger compartment as feed-back of the comfort perceived by the user (in particular, the equivalent temperature $T_{eq}$ measured in an area corresponding to the outlet vents) and the set-point temperature $T_{sp}$ required by the user, and on the basis of this temperature error the threshold temperature $T_{thresh}$ is calculated according to the expression:

$$T_{thresh} = \beta - \Delta \cdot (T_{eq} - T_{sp})$$

where $\beta$ and $\Delta$ are constant calibration parameters of appropriate value, chosen on the basis of the particular type of air-conditioning system, for example equal to 17 and 3, respectively. In particular, from the aforesaid expression, it is obtained that, at least in the summer management, the threshold temperature $T_{thresh}$ increases linearly with the set-point temperature $T_{sp}$ set by the user, and is inversely correlated to the aforesaid temperature error, decreasing as the error increases, and vice versa.

In winter management, block 52, connection/disconnection control of the compressor 18 must take into account that an insufficient air dehumidification could lead to misting of the windscreen, and consequently the algorithm verifies first whether the system is in conditions of air recirculation or of intake of external air, in so far as this determines air temperature at the inlet of the evaporator.

If the air-conditioning system is in a condition of intake of external air, there is a passage to a block 53, in which the target temperature $T_{target}$ is compared with the external temperature $T_{ext}$ outside the passenger compartment. The target temperature $T_{target}$ is also calculated as a function of the aforesaid temperature error between the effective conditions in the passenger compartment and the requirements of the user, for example via a PID (Proportional Integral Derivative) control and logics not illustrated in detail.

If the relation $T_{target} < T_{ext}$ is satisfied, there is a passage to a block 54, in which the threshold temperature $T_{thresh}$ of the compressor 18 is calculated by means of the following expression:

$$T_{thresh} = T_{target} - K$$

where K is an appropriate constant, for example equal to 1. It is to be noted that, since the target temperature $T_{target}$ is calculated by the control logic according to the set-point temperature $T_{sp}$, also in this case the threshold temperature for the compressor 18 is a function of the set point set by the user.

Otherwise, i.e., in the case where the relation $T_{target} \geq T_{ext}$ is satisfied, there is a passage to a block 55, in which the threshold temperature $T_{thresh}$ is calculated as follows:

$$T_{thresh} = T_{ext} - \Delta$$

hence according to the external temperature.

If, instead, the air-conditioning system is in a condition of air recirculation, in a block 56 subsequent to block 52 a relation of comparison between the target temperature $T_{target}$ and the temperature of the passenger compartment $T_{p.comp}$ is evaluated.

If the relation $T_{target} \ll T_{p.comp}$ is satisfied, there is a passage to a block 57, in which the threshold temperature $T_{thresh}$ of the compressor 18 is calculated, once again according to the target temperature, by means of the expression:

$$T_{thresh} = T_{target} - K$$

Otherwise, there is a passage to a further block 58r in which the threshold temperature $T_{thresh}$ is calculated according to the temperature of the passenger compartment, as:

$$T_{thresh} = T_{comp} - \Delta$$

In any case, the threshold temperature $T_{thresh}$ calculated on the basis of the algorithm described is saturated between a minimum value equal, for example, to 3° C. (to which the calculated values lower than said minimum value are brought) and a maximum value equal for example to 15° C. (to which the calculated values higher than said maximum value are brought).

Conveniently, a hysteresis can moreover be envisaged for each threshold crossing so as to prevent excessive oscillations. The control electronics 33, in winter management, will drive the mixer 15 appropriately so as to bring the temperature measured in the passenger compartment (in particular the equivalent temperature $T_{eq}$) to the target temperature $T_{target}$. The driving operation takes into consideration, in a per se known manner, also the engine water temperature. Furthermore, if the compressor 18 is deactivated and the control electronics 33 detects, via appropriate sensors, activation of the windscreen wipers of the vehicle, the same control electronics 33 can force activation of the compressor 18 (on the basis of the threshold temperature $T_{thresh}$ calculated at the previous instant) to prevent misting of the glass surfaces of the vehicle.

In addition to what has been described above, if the external temperature $T_{ext}$ is higher than a given threshold, at "key-on" the control system envisages that the air-recirculation system 40 is taking in external air for an initial pre-set time, at the end of which the system issues a command for air renewal for a second pre-set time so as to guarantee the physiological air change in the passenger compartment. If, instead, the external temperature $T_{ext}$ is lower than said given threshold, the system issues a command for the air-recirculation system again for intake of external air. The same occurs if the windscreen wipers are functioning. It is to be noted that, in any case, the air-recirculation system and the compressor 18 can be forced by the user into the desired condition of operation.

From an examination of the characteristics of the control system provided according to the present invention the advantages that it enables emerge clearly.

In particular, it enables a considerable energy saving, with respect to the case where the connection/disconnection threshold of the compressor is kept fixed. The compressor works in on-off mode with respect to the connection/disconnection threshold, so as to generate on average a desired temperature downstream of the evaporator. In this way, there is prevented as much as possible a post-heating of the air treated by the evaporator. The strategy for controlling the threshold temperature of the compressor hence enables a saving of energy to be obtained also in systems that use fixed-displacement compressors, achieving results that approach the ones already obtained with the adoption of the more sophisticated and costly variable-displacement compressors of the external-control type, but without the increase in costs that the adoption of this component would involve. The resulting refrigerating cycle has an evaporation pressure that is higher on average, while the condensation level is fixed by the external temperature. Since pressure levels are closer the absorption of power by the engine is reduced.

The described system also enables definition of the range of temperatures within which the mode of operation (with variable connection/disconnection threshold) is acceptable, taking into account the need not to send excessively humid air into the passenger compartment. In addition, it enables definition of the threshold control in the conditions of winter and summer operation to ensure the de-misting performance.

Using a minimal electronics, the control system can obtain the aforesaid advantages even in air-conditioning systems of a manual type, establishing a relation between the setting of the knob for setting the temperature (connected to an electrified or non-electrified assembly) and the level of the on-off threshold of the compressor.

Clearly, the control logic is optimized in automatic air-conditioning systems, in which, in at least certain operating conditions, the threshold temperature of the compressor is determined according to an error between the set-point temperature set by the user and a temperature detected within the passenger compartment, indicating the thermal comfort perceived by the user.

Finally, it is clear that modifications and variations can be made to what is described and illustrated herein, without thereby departing from the scope of the present invention, as defined in the annexed claims.

In particular, the described system is applicable in manual or automatic control systems, which use a fixed-displacement compressor or a variable-displacement compressor with clutch.

Furthermore, the connection/disconnection threshold of the compressor can be controlled with hysteresis, by means of two distinct thresholds of connection and disconnection. In this case, both the connection threshold and the disconnection threshold may be varied as described previously in a corresponding way, or else just one of the two thresholds may be varied, for example just the connection threshold or just the disconnection threshold.

Finally, the present invention also finds application in air-conditioning systems with intermediate fluid, namely in systems in which a refrigerating gas exchanges cooling capacity with an intermediate fluid, for example water and glycol, and the intermediate fluid exchanges in turn cooling capacity with the air that is used to cool off the passenger compartment.

The invention claimed is:

1. A system for controlling an air-conditioning system of the passenger compartment of a vehicle provided with an evaporator and a compressor coupled to said evaporator, comprising a control unit configured to switch an operating condition of said compressor when the temperature at outlet from said evaporator has a pre-set relation with a threshold temperature ($T_{thresh}$), characterized in that said control unit is further configured to vary the value of said threshold temperature ($T_{thresh}$) as a function, in at least certain operating conditions, of a set-point temperature ($T_{sp}$), required by a user of said air-conditioning system;

wherein said air-conditioning system is of a manual type, and said set-point temperature ($T_{sp}$) can vary within a first range of values, corresponding to a condition of cooling of said passenger compartment, and within a second range of values, corresponding to a condition of heating of said passenger compartment; and said control unit being configured to cause a linear increase in said threshold temperature ($T_{thresh}$) as said temperature ($T_{sp}$) increases within said first range of values, and to cause a linear decrease of said threshold temperature ($T_{thresh}$) as said set-point temperature ($T_{sp}$) increases within said second range of values.

2. The system according to claim 1, wherein said first operating condition corresponds to a condition of cooling of said passenger compartment.

3. The system according to claim 1, wherein said control unit is configured to switch said compressor between an on operating condition and an off operating condition, and to vary the value of said threshold temperature ($T_{thresh}$) also when said compressor is in said off operating condition.

4. The system according to claim 3, wherein said air-conditioning system further comprises control means that can be actuated by a user to force switching of said compressor from said on operating condition to said off operating condition, or vice versa; and wherein said control unit is configured to vary the value of said threshold temperature ($T_{thresh}$) also when said compressor is in a forced off operating condition.

5. The system according to claim 1, wherein said linear increase and said linear decrease have a substantially equal and opposite pattern, and said second range of values follows continuously said first range of values.

6. The system according to claim 1, further comprising manual-setting means that can be actuated by said user for setting said set-point temperature ($T_{sp}$) and can move within a first sector, corresponding to said condition of cooling of said passenger compartment, and within a second sector, corresponding to said condition of heating of said passenger compartment; a variation of said set-point temperature ($T_{sp}$) within said first and second range of values corresponding to the displacement of said manual-setting means within said first and second sector, respectively.

7. The system according to claim 1, wherein said compressor is of the fixed-displacement type, or else of the variable-displacement type with clutch.

8. An air-conditioning system comprising a control system according to claim 1.

9. A vehicle, comprising an air-conditioning system according to claim 8.

10. A system for controlling an air-conditioning system of the passenger compartment of a vehicle provided with an evaporator and a compressor coupled to said evaporator, comprising a control unit configured to switch an operating condition of said compressor when the temperature at outlet from said evaporator has a pre-set relation with a threshold temperature ($T_{thresh}$), characterized in that said control unit is further configured to vary the value of said threshold temperature ($T_{thresh}$) as a function, in at least certain operating conditions, of a set-point temperature ($T_{sp}$), required by a user of said air-conditioning system;

wherein said control unit is configured to cause an increase in said threshold temperature ($T_{thresh}$) as said set-point temperature increases ($T_{sp}$), in at least a first operating condition of said air-conditioning system; and wherein said air-conditioning system is of an automatic type and said control system further comprises sensor means adapted to detect a first internal temperature ($T_{eq}$) at a first position within said passenger compartment; said control unit being further configured to determine said threshold temperature ($T_{thresh}$) as a function of a difference between said first internal temperature ($T_{eq}$) and said set-point temperature ($T_{sp}$), in said first operating condition.

11. The system according to claim 10, wherein said control unit is configured to vary said threshold temperature ($T_{thresh}$) in a way inversely correlated to said difference, said, threshold temperature ($T_{thresh}$) increasing as said difference decreases.

12. The system according to claim 10, wherein said control unit is configured to calculate said threshold temperature ($T_{thresh}$) by means of the expression:

$$T_{thresh} = \beta - \Delta \cdot (T_{eq} - T_{sp})$$

in which $\beta$ and $\Delta$ are calibration parameters.

13. The system according to claim 10, wherein said control unit is configured to determine said first operating condition, when said first internal temperature ($T_{eq}$) is higher than said set-point temperature ($T_{sp}$), and to determine a second operating condition, corresponding to a condition of heating of said passenger compartment, otherwise.

14. The system according to claim 13, wherein said control unit is further configured to calculate a target temperature ($T_{target}$) that is to be generated by said air-conditioning system on the basis of the requirements of, said user, and in said second operating condition, to compare said target temperature ($T_{target}$) with a comparison temperature ($T_{ext}$, $T_{p\ comp}$), and to determine said threshold temperature ($T_{thresh}$) as a function alternatively of said target temperature ($T_{target}$) or of said comparison temperature ($T_{ext}$, $T_{p\ comp}$) according to the result of said comparison.

15. The system according to claim 14, wherein said sensor means are further configured for detecting an external temperature ($T_{ext}$) outside said passenger compartment, and a second internal temperature ($T_{p\ comp}$) detected at a second position inside said passenger compartment, and said comparison temperature ($T_{ext}$, $T_{p\ comp}$) corresponds to said external temperature ($T_{ext}$) or to said second internal temperature ($T_{p\ comp}$) according to whether the air-conditioning system is in a condition of intake of external air or a condition of air recirculation, respectively.

16. The system according to claim 15, wherein said air-conditioning system is also provided with diffusing means fluid-connected to the outlet of said evaporator and in communication with said passenger compartment, and said first internal temperature ($T_{eq}$) is a temperature measured at outlet from said diffusing means, and said second internal temperature ($T_{p\ comp}$) is a temperature measured in a different position of said passenger compartment.

17. The system according to claim 16, wherein said target temperature ($T_{target}$) is a temperature at said diffusing means that said control unit deems necessary for reaching said set-point temperature ($T_{sp}$), and is calculated as a function of said difference, in particular via a proportional-integral-derivative control.

18. The system according to claim 10, wherein said first operating condition corresponds to a condition of cooling of said passenger compartment.

19. The system according to claim 10, wherein said compressor is of the fixed-displacement type, or else of the variable-displacement type with clutch.

20. An air-conditioning system comprising a control system according to claim 10.

* * * * *